(12) United States Patent
Wartski et al.

(10) Patent No.: US 6,246,699 B1
(45) Date of Patent: Jun. 12, 2001

(54) CENTRALIZED ROUTING SCHEME FOR DISTRIBUTED CROSS-CONNECT USING SYNCHRONIZED ADDRESS FIELD

(75) Inventors: Mark C. Wartski, Raleigh; Thomas E. O'Shea, Chapel Hill, both of NC (US)

(73) Assignee: Pliant Systems, Inc., Research Triangle Park, NC (US)

( * ) Notice: Subject to any disclaimer, the term of this patent is extended or adjusted under 35 U.S.C. 154(b) by 0 days.

(21) Appl. No.: 09/324,464

(22) Filed: Jun. 2, 1999

(51) Int. Cl.[7] .................................................. H04J 3/16
(52) U.S. Cl. ............................................................ 370/498
(58) Field of Search ....................................... 370/498, 503, 370/441, 347, 349, 350, 345, 337, 320, 535, 537, 459, 461, 462, 389, 351, 451, 442, 352, 387, 388

(56) References Cited

U.S. PATENT DOCUMENTS 4,679,191 * 7/1987 Nelson et al. ..................... 340/825.5
5,490,252 * 2/1996 Macera et al. ..................... 370/395

* cited by examiner

*Primary Examiner*—Dang Ton
(74) *Attorney, Agent, or Firm*—Allen, Dyer, Doppelt, Milbrath & Gilchrist, P.A.

(57) ABSTRACT

A centralized cross-connect (DS0)-time slot routing scheme for multiple bandwidth communication circuit cards is executed by a supervisory control card installed in a distributed backplane of a time division multiplex (TDM)-based communication system equipment shelf. The distributed backplane supports a plurality of TDM time slots, and has a plurality of card slots in which communication circuits cards are installed. A relational database provides a transport association among the TDM time slots of the backplane and DS0 communication channels of communication circuits cards that allows any DS0 communication channel of any port of any communication circuit card to be associated with any TDM communication transport time slot of the backplane. The supervisory control card controls the transport of DS0 communication channels in selected TDM communication transport time slots in accordance with the contents of the relational database.

9 Claims, 2 Drawing Sheets

CENTRALIZED ROUTING SCHEME FOR DISTRIBUTED CROSS-CONNECT USING SYNCHRONIZED ADDRESS FIELD

FIELD OF THE INVENTION

The present invention relates in general to communication networks and systems for transporting digital telecommunication signals, and is particularly directed to a new and improved cross-connect routing scheme for a distributed backplane architecture of a time division multiplex (TDM)-based telecommunication system equipment shelf, card installation slots of which may include different bandwidth telecommunication circuits, (DS0) time slots among which are stored in a relational database and assigned for transport by a supervisory control processor resident on a backplane controller card. This database is scanned onto a control bus in synchronous step with the TDM slots it administers, resulting in a simple hardware-based interconnection from their source and destination circuits.

BACKGROUND OF THE INVENTION

Digital network communication systems enable telecommunication service providers to supply multiple types of information channels from a sourcing site, such as a central office, to a network termination interface at a remote site serving a number of customer premises equipments (CPEs). A reduced complexity example of such a digital communication network architecture is diagrammatically illustrated in FIG. 1 as comprising a TDM communication link (such as an optical fiber) 10, through which a central office (CO) 20 at a 'west' end of the TDM link 10 transmits and receives digital telecommunication (e.g., T1 (1.544 Mb/s)) traffic with respect to customer premises equipments served by a remote termination site 30 at an 'east' end of the PCM link 10. The central office 20 may include a central office switch 21 (such as a 5ESS switch manufactured by AT&T), that contains a plurality of line terminations 22, each of which is coupled over digital facilities and distributed onto a local loop (twisted tip/ring pair) to a respective local DS0 customer site.

As shown in FIG. 2, to provide telecommunication service to remote customer equipments, the equipment shelf of a remote terminal 30 terminating the 'east' end of the PCM link 10 contains a network interface unit (NIU) 31, that is coupled over an internal bus or backplane 32 to a plurality of circuit cards 33 installed in the interface unit's backplane 34. Historically, each circuit card 33 was dedicated to providing telecommunication service for a particular piece of remote customer premises equipment, via a local loop 35 between the circuit 33 card and DS0 digital communication equipment 37 installed at a respective customer premises.

However, with improvements in integration circuit density and signal processing speed, digital telecommunication circuit manufacturers now offer a variety of multiple port devices having a wide range of operational bandwidth and digital subscriber line termination capabilities. Now although these enhanced bandwidth capability devices can transport a substantially increased amount of information, and/or enable a single card to service a relatively large number of terminating devices, their diverse configurations have required that transport connectivity among devices be effected by means of point-to-point communication links, which prevents their integration into an equipment shelf having a distributed backplane architecture.

SUMMARY OF THE INVENTION

In accordance with the present invention, this distributed bus integration problem is successfully remedied by a centralized cross-connect (DS0-time slot) routing scheme, that is executed by a supervisory control card of a time division multiplex (TDM)-based communication system equipment shelf having a distributed bus architecture, that allows any card slot of the backplane to interface any type of communication circuit card, irrespective of its bandwidth capability relative to the bandwidth capabilities of other circuit cards installed in the backplane.

By distributed routing is meant that all DS0 channels are assigned to TDM time slots by a common supervisory control processor, rather than being necessarily transported in the fixed order of the sequential card slot positions of the backplane. This means that any DS0 channel of any port of any card may be transported during any time slot. In a backplane architecture having multibit control, data and address links distributed among a plurality of card slots, one or more of the card slots contains a control card that supervises the operation of the equipment 1shelf (including the DS0 channel routing scheme of the invention).

For purposes of providing a non-limiting example, the centralized communication channel—time slot routing scheme of the invention will be described for DS0 channels of an eight bit-wide telecommunication bus, having a transport bandwidth of 131.072 Mb/s (2048 time slots per 125 µsec extended superframe). Non-limiting examples of different bandwidth transceiver cards with which the invention may be used include basic DS-1 rate signaling cards, VT1.5 format cards, TU12 and VC12 format cards, AU-3 and STS-1 format cards and OC-3 format cards.

As will be described, the DS0-time slot routing scheme of the invention employs a relational database among the time slots of the backplane available for DS0 channel transport, each communication circuit card slot address, the port address of each communication circuit card, and the DS0 channels of each port. In particular, each of the available backplane time slots is assigned a DS0 channel for transport by means of an associated N bit wide addressable memory location of a time slot memory, which stores all information necessary to fully associate each time slot with a corresponding DS0 channel being serviced. This relational database is scanned onto a distributed control bus in time synchronization with the distributed TDM bs.

A first portion of a time slot-assigning word stored in a respective time slot memory location contains the identification of the card slot, in which the digital communication card that transmits/receives a respective DS0 byte during its associated time slot is installed. A second portion of the data word contains the identification of the particular port of that communication card, through which the associated DS0 channel is interfaced for the time slot. A third portion of the data word contains the identification of the DS0 byte. To automatically rout the time slots for data transport, the backplane's communication controller card simply scans the time slot memory (relational database). As data is read out of the successive memory locations, DS0 channels are automatically associated with the successive time slots. Since DS0 channels are not necessarily assigned in the order of sequential card slot position, any DS0 channel may be transported during any time slot.

DETAILED DESCRIPTION

Figure 1:
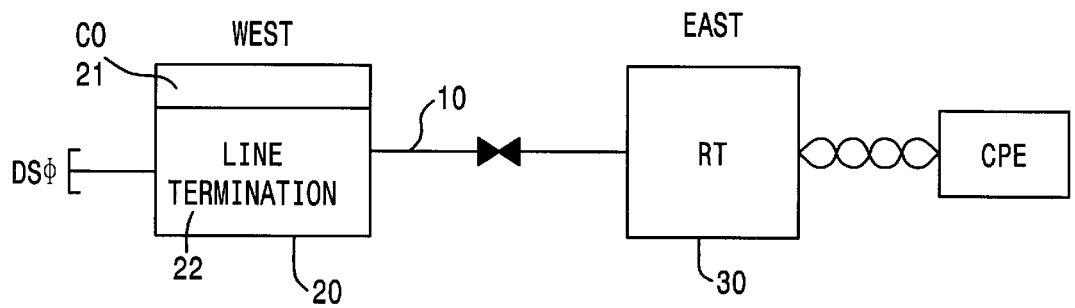
FIG. 1 diagrammatically illustrates a reduced complexity example of a digital communication network architecture.
Figure 2:
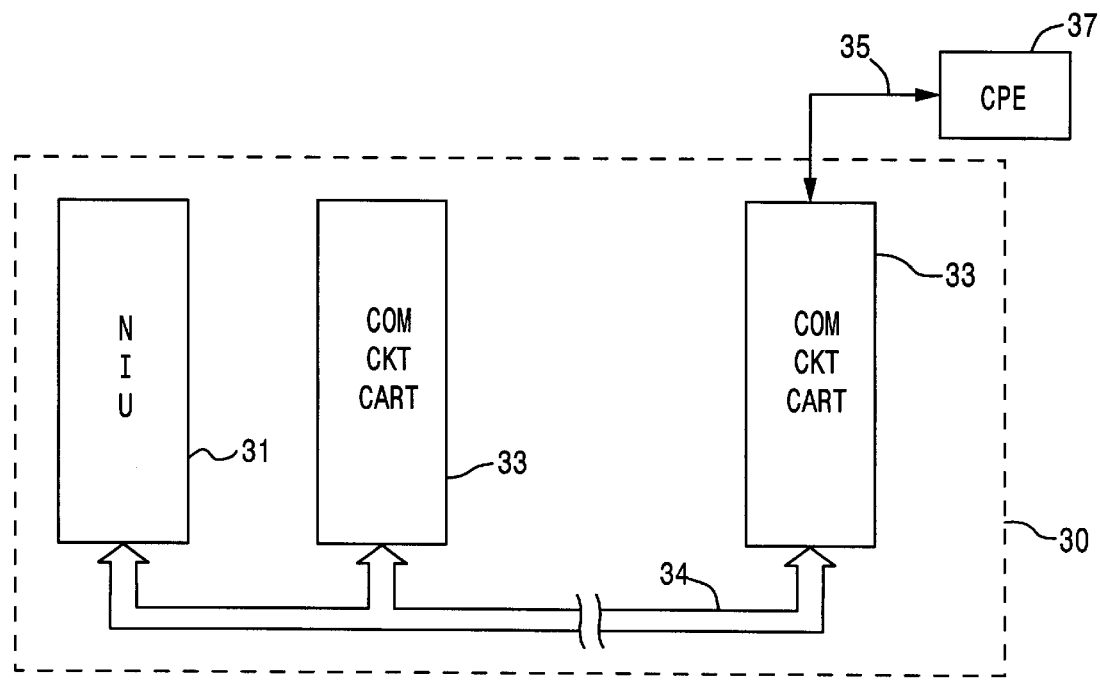
FIG. 2 diagrammatically shows the equipment shelf of a remote terminal terminating the a PCM link.

Before describing in detail the new and improved distributed backplane DS0-time slot cross-connect scheme in accordance with the present invention, it should be observed that the invention resides primarily in what is effectively a prescribed arrangement of conventional communication circuits and associated digital signal processing components and attendant supervisory control circuitry therefor, that controls the operations of such circuits and components. As a consequence, the configuration of such circuits components and the manner in which they are interfaced with other communication system equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of the system in a convenient functional grouping, whereby the present invention may be more readily understood.

Figure 3:
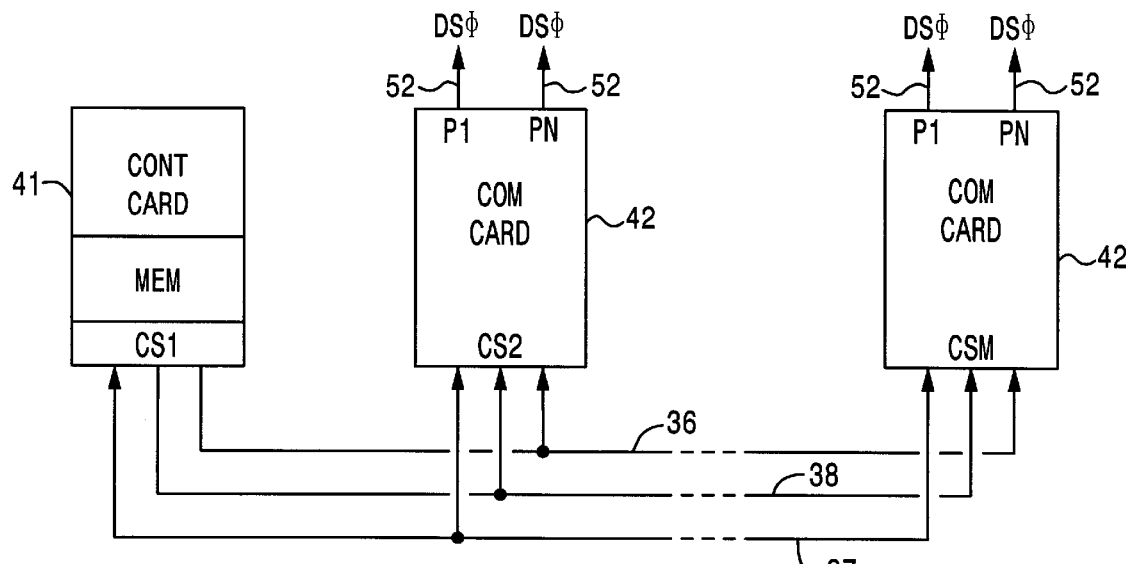
FIG. 3 diagrammatically illustrates a reduced complexity distributed backplane architecture for an equipment shelf of a remote terminal of a time division multiplex digital communication system, that supports distributed digital transport connectivity for a plurality of transceiver cards, bandwidth requirements for which may vary.

FIG. 3 diagrammatically illustrates a reduced complexity distributed backplane architecture for an equipment shelf of a remote terminal of a time division multiplex (TDM) digital communication system, that is intended to support distributed digital transport connectivity for a plurality of transceiver cards, bandwidth requirements for which may vary. As described briefly above, for purposes of providing a non-limiting example, the invention will be described in association with an eight bit-wide telecommunication bus, having a DS0 channel transport bandwidth of 131.072 Mb/s (i.e. 2048 time slots per 125 μsec extended superframe). It should be observed however that the invention is not limited to this or any other set of communication parameters, but is applicable to essentially any type of distributed TDM communication backplane architecture.

Examples of transceiver cards, having DS0 time slot assignments provided by the centralized routing scheme of the present invention, include basic DS-1 rate signalling cards employing 24 DS0 communication channels or time slots, VT1.5 format cards employing 27 DS0 time slots, TU12 and VC12 format cards employing 36 DS0 time slots, AU-3 and STS-1 format cards employing 810 DS0 time slots, channelized OC-3 format cards employing 1992 DS0 time slots, and non-channelized OC-3 format cards employing 2016 DS0 time slots.

The distributed backplane architecture of FIG. 3 contains respective multibit bus links including control, data and address links 36, 37 and 38, at which edge connectors of a plurality of card slots CS1–CSM are installed. A prescribed number J of the card slots receive one or more shelf control cards that supervise the operation of the equipment shelf via the control bus portion 36 and address portion 38 of the backplane. For the reduced complexity example of the presently described embodiment, backplane operation may be supervised by a single controller card 41 installed in card slot CS1, so that the remaining card slots CS2–CSM may be used for the installation of one or more (up to M−1) communication cards 42, that are ported via links 52 to one or more pieces of digital telecommunication equipment served by the equipment shelf. As pointed out above, the communication cards installed in card slots CS2–CSM are not limited to a particular type of bandwidth capacity, but can be expected to include different bandwidth telecommunication circuits, (DS0) time slots of which are routed by the supervisory control processor resident on backplane controller card 41.

Figure 4:
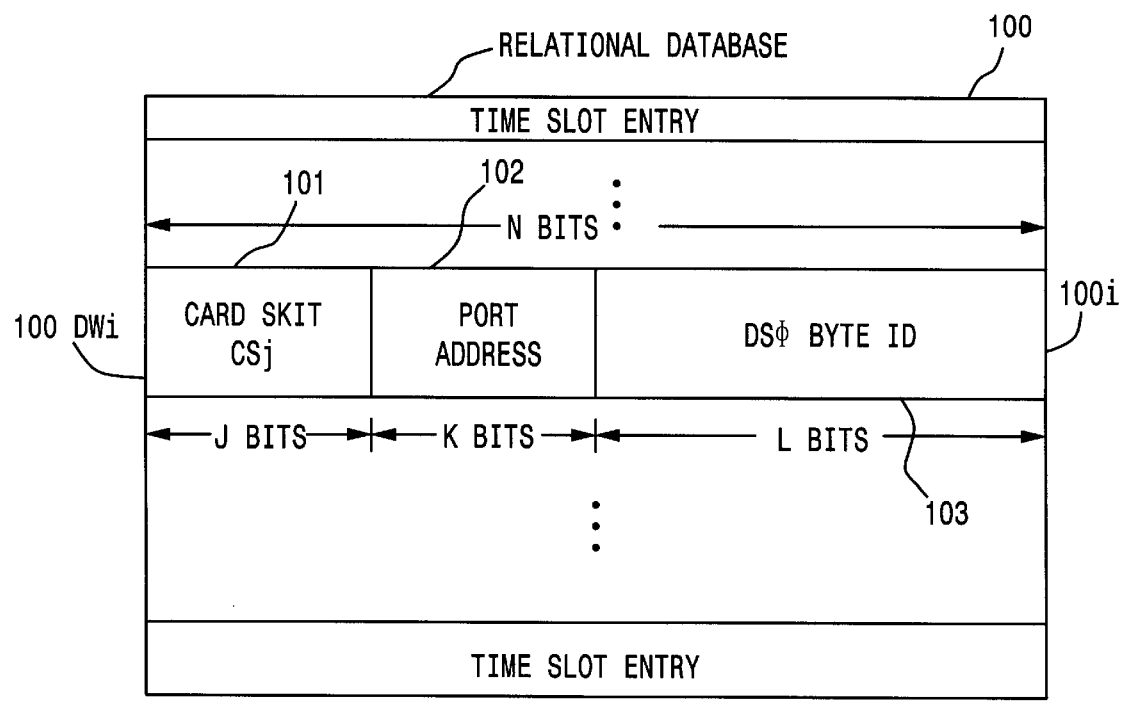
FIG. 4 diagrammatically illustrates a mapping scheme for providing centralized routing of DS0 channels to backplane time slots for one or more circuit cards installed in the backplane of FIG. 3.

In order to provide for distributed assignment of the time slots to DS0 channels of one or more circuit cards installed in the backplane, and whose bandwidth requirements are not necessarily the same, the control processor of the backplane controller card 41 employs a relational data base which stores a TDM time slot—DS0 communication channel association as diagrammatically illustrated in FIG. 4. As shown therein, this routing database provides a relationship among the all of the available time slots of the backplane available for data transport, each communication card's slot address, a port address per identified communication card, and each DS0 channel per card port.

In the present example of 2048 available time slots of a DS0 channel transport bandwidth of 131.072 Mb/s, for the above examples of differing bandwidth transceiver cards, such a backplane timeslot capacity provides a significantly augmented degree of versatility, as it readily allows a typical shelf backplane having eighteen communication service card slots to accommodate up to eighteen basic DS-1 rate signalling cards, (i.e., a basic DS-1 rate signalling card in each card slot, since 2048 time slots provide for a total bandwidth of 84 DS-1 rate circuits), up to eighteen VT1.5 cards, up to eighteen TU12 and VC12 cards, up to two AU-3 and STS-1 cards, or one OC-3 card.

In accordance with the invention, each of the time slots available for DS0 channel transport (time slots $TS_1$–$TS_{2048}$ in the present example) is assigned a DS0 channel by means of the contents of an associated N bit wide addressable memory location of a time slot relational data base stored in (random access) memory 100. Namely, this relational data base stores all the items necessary to fully associate each time slot TS with a corresponding DS0 channel being serviced. Unlike conventional digital communication channel bank equipment shelves, DS0 time slot position is not necessarily sequentially associated with the order of card position along the backplane. Moreover, in the event it becomes necessary to change out a card, or switch over to a back-up protection card (using a back-up protection switching scheme such as that described in the U.S. Patent to Ferguson, U.S Pat. No: 4,972,405, as a non-limiting example), it is only necessary to change the card slot address to the protection card slot in the relational database.

As shown in FIG. 4, each of a first (J bit) portion 101 of the N bit wide data word 100DWi stored in a respective memory location 100i contains the identification of the card slot $CS_j$, in which the digital communication circuit that transmits/receives a respective DS0 byte during its associated time slot $TS_i$ is installed. A second (K bit) portion 102 of the data word identifies the particular port P of that communication circuit, through which the associated DS0 is interfaced for the time slot $TS_i$; a third (L bit) portion 103 of the data word contains the identification of the DS0 byte (of the twenty-four DS0 s for a DS-1 based system of the present example). To assign respective ones of (2048) time slots for data transport, the backplane's communication controller card scans the time slot memory 100, and reads out the contents of the successively addressed memory locations, automatically associating which DS0 channel is to be transported in each successive time slot.

It can be seen, therefore, that the centralized cross-connect time slot routing scheme of the present invention allows a supervisory control card of a time division multiplex (TDM)-based communication system equipment shelf to interface any type of communication circuit card of a distributed backplane with any other circuit card in the backplane, irrespective of their individual bandwidth capacities. As DS0 time slots are not necessarily assigned in the order of sequential card slot position, any DS0 channel may be transported during any time slot. Scanning the database onto the control bus in synchronism with the TDM slots it administers provides a relatively simple hardware-based interconnection between source and destination circuits.

While we have shown and described a preferred embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. For use with a telecommunication network having a plurality of time division multiplexed (TDM) communication time slots for transporting communication channels employed by a plurality of telecommunication devices installed in card slots of a distributed communication backplane, a method of routing respective ones of said communication channels via selected ones of said TDM communication time slots comprising the steps of:

(a) providing an association among time TDM communication slots of said communication backplane available for data transport, card slots containing telecommunication devices, port addresses of said telecommunication devices, and communication channels of said port addresses; and (b) assigning, by way of said distributed backplane, respective ones of said communication channels to selected ones of said TDM communication time slots, in accordance with said association provided in step (a).

2. A method according to claim 1, wherein step (b) comprises stepping through said memory locations of said time slot memory to assign respective ones of said communication channels to selected ones of said TDM communication time slots.

3. A method according to claim 1, wherein said communication channels comprise DS0 communication channels.

4. A method of conducting time division multiplexed (TDM) communications by way of a telecommunication network comprising the steps of:

(a) installing communication circuits cards, having bandwidth capabilities that are not necessarily the same, in card slots of a distributed communication backplane that supports a plurality of TDM communication transport time slots;

(b) providing a relational database that provides an association among said TDM communication time slots of said communication backplane, card slots containing communication circuit cards, port addresses of said communication circuit cards, and communication channels of said port addresses, and allows any communication channel of any of said communication circuits cards to be transported in any TDM communication transport time slot of said communication backplane;

(c) transporting communication channels of said communication circuits cards in TDM communication transport time slots of said communication backplane in accordance with contents of said relational database provided in step (b).

5. A method according to claim 4, wherein said communication circuits cards comprise DS-1 based communication circuit cards, and said communication channels comprise DS0 communication channels.

6. A method according to claim 4, wherein step (b) comprises storing said relational database in a memory employed by a communications control processor resident on a backplane-installed controller card, which is operative in step (c) to access contents of said relational database, and control transport of communication channels of said communication circuits cards in TDM communication transport time slots of said communication backplane.

7. A communications arrangement for conducting time division multiplexed (TDM) communications by way of a telecommunication network comprising:

a distributed communication backplane that supports a plurality of TDM communication transport time slots, and having a plurality of card slots containing communication circuits cards whose bandwidth capabilities are not necessarily the same;

a relational database that provides a transport association among TDM communication transport time slots of said communication backplane, card slots containing communication circuit cards, port addresses of said communication circuit cards, and communication channels of said port addresses that allows any communication channel of any of said communication circuits cards to be associated with any TDM communication transport time slot of said communication backplane; and a supervisory communications controller coupled to said backplane and being operative to access contents of said relational database, and control transport of communication channels of said communication circuits cards in TDM communication transport time slots of said communication backplane in accordance with contents of said relational database.

8. A communications arrangement according to claim 7, wherein said communication circuits cards comprise DS-1 based communication circuit cards, and said communication channels comprise DS0 communication channels.

9. A communications arrangement according to claim 7, wherein said relational database is stored in a memory employed by said communications control processor of a backplane-installed controller card.

* * * * *